United States Patent
Nishiyama et al.

(10) Patent No.: US 10,054,368 B2
(45) Date of Patent: Aug. 21, 2018

(54) LAMINATED HEADER, HEAT EXCHANGER, AIR-CONDITIONING APPARATUS, AND METHOD OF JOINING A PLATE-LIKE UNIT OF A LAMINATED HEADER AND A PIPE TO EACH OTHER

(71) Applicant: Mitsubishi Electric Corporation, Tokyo (JP)

(72) Inventors: Takumi Nishiyama, Tokyo (JP); Akira Ishibashi, Tokyo (JP); Takuya Matsuda, Tokyo (JP); Shinya Higashiiue, Tokyo (JP); Atsushi Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 241 days.

(21) Appl. No.: 14/900,280

(22) PCT Filed: Jul. 8, 2013

(86) PCT No.: PCT/JP2013/068676
§ 371 (c)(1),
(2) Date: Dec. 21, 2015

(87) PCT Pub. No.: WO2015/004719
PCT Pub. Date: Jan. 15, 2015

(65) Prior Publication Data
US 2016/0195335 A1 Jul. 7, 2016

(51) Int. Cl.
*F28F 9/02* (2006.01)
*F28D 1/053* (2006.01)
(Continued)

(52) U.S. Cl.
CPC ......... *F28D 1/05375* (2013.01); *B21D 53/08* (2013.01); *F28D 1/0476* (2013.01);
(Continued)

(58) Field of Classification Search
CPC ............... F28D 1/05375; F28D 1/0476; F28D 1/05366; F28D 1/05383; F28D 2021/0068;
(Continued)

(56) References Cited

U.S. PATENT DOCUMENTS 2,298,996 A * 10/1942 Woods ................. F28D 7/1653
165/133
4,917,180 A * 4/1990 Wolf .................... F28D 1/05375
165/150
(Continued)

FOREIGN PATENT DOCUMENTS

JP 52-128861 A 10/1977
JP 03-047651 U 5/1991
(Continued)

OTHER PUBLICATIONS

Japanese Office Action dated Sep. 6, 2016 in the corresponding JP application No. 2015-526037. (English translation attached).
(Continued)

*Primary Examiner* — Justin Jonaitis
(74) *Attorney, Agent, or Firm* — Posz Law Group, PLC

(57) ABSTRACT

A laminated header includes a plate-like unit including: bare members having first flow passages formed therein with no brazing material being applied to each of the bare members; and cladding members having second flow passages formed therein with a brazing material being applied to at least a front surface and a back surface of each of the cladding members. The bare members and the cladding members are alternately laminated so that the first flow passages and the second flow passages communicate with each other. A pipe is joined to the plate-like unit under a state in which an end portion of the pipe is inserted into at least one of the first flow passages or the second flow passages. One of the bare members is laminated on an outermost side of the plate-like
(Continued)

unit in a laminating direction of the bare members and the cladding members.

13 Claims, 10 Drawing Sheets

(51) Int. Cl.
  *F28D 1/047* (2006.01)
  *B21D 53/08* (2006.01)
  *F28F 9/18* (2006.01)
  *F28D 21/00* (2006.01)
  *B23K 1/00* (2006.01)

(52) U.S. Cl.
  CPC ..... *F28D 1/05366* (2013.01); *F28D 1/05383* (2013.01); *F28F 9/0221* (2013.01); *F28F 9/0224* (2013.01); *F28F 9/0278* (2013.01); *F28F 9/18* (2013.01); *B23K 1/0012* (2013.01); *F28D 2021/0068* (2013.01)

(58) Field of Classification Search
  CPC ...... B21D 53/08; F28F 9/0221; F28F 9/0224; F28F 9/0278
  USPC ........................................................ 165/174
  See application file for complete search history.

(56) References Cited

U.S. PATENT DOCUMENTS

| | | | | |
|---|---|---|---|---|
| 5,186,246 A | * | 2/1993 | Halstead | B60H 1/3227 165/140 |
| 5,241,839 A | * | 9/1993 | Hughes | B60H 1/3227 165/174 |
| 5,242,016 A | * | 9/1993 | Voss | F25B 39/028 165/173 |
| 5,546,761 A | * | 8/1996 | Matsuo | F25B 39/04 165/173 |
| 6,446,713 B1 | * | 9/2002 | Insalaco | F28D 1/05366 165/173 |
| 2004/0159121 A1 | * | 8/2004 | Horiuchi | F25B 39/02 62/526 |
| 2006/0086486 A1 | * | 4/2006 | Sudo | B23K 1/0012 165/143 |
| 2007/0251682 A1 | * | 11/2007 | Sasaki | F28D 1/0391 165/153 |
| 2016/0076823 A1 | * | 3/2016 | Okazaki | F28F 9/028 165/174 |

FOREIGN PATENT DOCUMENTS

| | | |
|---|---|---|
| JP | 06-011291 A | 1/1994 |
| JP | 2007-298197 A | 11/2007 |
| JP | 2008-249241 A | 10/2008 |
| JP | 2012-172936 A | 9/2012 |

OTHER PUBLICATIONS

Extended European Search Report dated Mar. 16, 2017 in the corresponding EP application No. 13889101.5.

Office Action dated Jul. 31, 2017 issued in corresponding CN patent application No. 2013800780948 (and English tanslation).

International Search Report of the International Searching Authority dated Aug. 27, 2013 for the corresponding international application No. PCT/JP2013/068676 (and English translation).

Office Action dated Nov. 30, 2016 issued in corresponding CN patent application No. 201380078094.8 (and English translation).

* cited by examiner (a)

(b)

(a)

(b)

(a)

(b)

(a)

(b)

LAMINATED HEADER, HEAT EXCHANGER, AIR-CONDITIONING APPARATUS, AND METHOD OF JOINING A PLATE-LIKE UNIT OF A LAMINATED HEADER AND A PIPE TO EACH OTHER

TECHNICAL FIELD

The present invention relates to a laminated header, a heat exchanger, an air-conditioning apparatus, and a method of joining a plate-like unit of a laminated header and a pipe to each other.

BACKGROUND ART

As a related-art laminated header, there is known a laminated header including a plate-like unit in which a bare member having a first flow passage formed therein with no brazing material being applied thereto and cladding members each having a second flow passage formed therein with a brazing material being applied to the front and back surfaces thereof are alternately laminated so that the first flow passage and the second flow passage are communicated with each other. A pipe is joined to the plate-like unit under a state in which the end portion of the pipe is inserted into the first flow passage (for example, see Patent Literature 1).

CITATION LIST

Patent Literature

Patent Literature 1: Japanese Unexamined Patent Application Publication No. 2008-249241 (Paragraph [0021], FIG. 2 to FIG. 7)

SUMMARY OF INVENTION

Technical Problem

In such a laminated header, the cladding member is laminated on the outermost side of the plate-like unit in the laminating direction, that is, the brazing material is applied to the outermost surface of the plate-like unit in the laminating direction. Thus, there is a problem in that the usage amount of the brazing material is large. Further, at the time of heating, the brazing material applied to the outermost surface of the plate-like unit in the laminating direction enters a gap between the pipe and the first flow passage and a gap between the pipe and the second flow passage to reach the end portion of the pipe and flow into the flow passage of fluid. Thus, there is a problem in that the pressure loss of the fluid flowing through the flow passage is increased.

The present invention has been made in view of the problems as described above, and therefore has an object to provide a laminated header, which is reduced in usage amount of a brazing material and suppressed in increase of pressure loss of fluid flowing through a flow passage. Further, the present invention has an object to provide a heat exchanger including the laminated header as described above. Still further, the present invention has an object to provide an air-conditioning apparatus including the heat exchanger as described above. Still further, the present invention has an object to provide a method of joining a plate-like unit of a laminated header and a pipe to each other, which is capable of reducing the usage amount of a brazing material and suppressing the increase of pressure loss of fluid flowing through a flow passage.

Solution to Problem

According to one embodiment of the present invention, there is provided a laminated header, including a plate-like unit including: bare members having first flow passages formed therein with no brazing material being applied to each of the bare members; and cladding members having second flow passages formed therein with a brazing material being applied to at least a front surface and a back surface of each of the cladding members, the bare members and the cladding members being alternately laminated so that the first flow passages and the second flow passages are communicated with each other, the plate-like unit being configured such that a pipe is joined to the plate-like unit under a state in which an end portion of the pipe is inserted into at least one of the first flow passages or the second flow passages, one of the bare members being laminated on an outermost side of the plate-like unit in a laminating direction of the bare members and the cladding members.

Advantageous Effects of Invention

In the laminated header according to the one embodiment of the present invention, the bare member is laminated on the outermost side of the plate-like unit in the laminating direction, that is, the brazing material is not applied to the outermost surface of the plate-like unit in the laminating direction. Thus, the usage amount of the brazing material is reduced. Further, the configuration in which the brazing material is not applied to the outermost surface of the plate-like unit in the laminating direction suppresses the phenomenon that the brazing material flows into the flow passage of the fluid at the time of heating. Thus, the increase of the pressure loss of the fluid flowing through the flow passage is suppressed.

DESCRIPTION OF EMBODIMENTS

Figure 1:
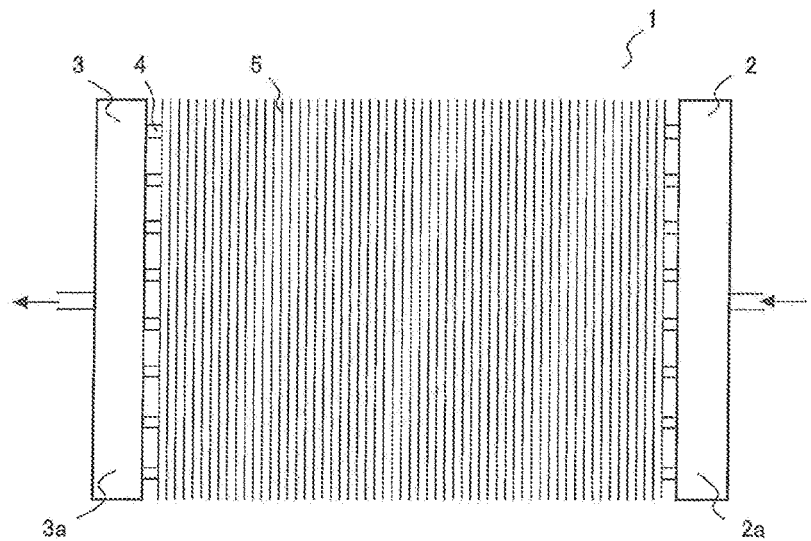
FIG. 1 is a view for illustrating a configuration of a heat exchanger according to Embodiment 1.

Now, a laminated header according to the present invention is described with reference to the drawings.

Note that, in the following, there is described a case where the laminated header according to the present invention is applied to a heat exchanger into which refrigerant flows, but the laminated header according to the present invention may be applied to other devices into which other fluids flow. Further, the configuration, operation, and other matters described below are merely examples, and the present invention is not limited to such configuration, operation, and other matters. Further, in the drawings, the same or similar components are denoted by the same reference symbols, or the reference symbols therefor are omitted. Further, the illustration of details in the structure is appropriately simplified or omitted. Further, overlapping description or similar description is appropriately simplified or omitted.

Embodiment 1

A heat exchanger according to Embodiment 1 is described.

<Configuration of Heat Exchanger>

Now, the configuration of the heat exchanger according to Embodiment 1 is described.

FIG. 1 is a view for illustrating the configuration of the heat exchanger according to Embodiment 1. Note that, in FIG. 1 and other figures, the refrigerant flow direction is indicated by the solid arrow.

As illustrated in FIG. 1, a heat exchanger 1 includes a laminated header 2, a header 3, a plurality of first heat transfer tubes 4, and a plurality of fins 5. Note that, the header 3 may be a laminated header similar to the laminated header 2, or may be a different type of header.

The laminated header 2 has a distribution flow passage 2a formed therein. A refrigerant pipe is connected to an inflow side of the distribution flow passage 2a. The plurality of first heat transfer tubes 4 are connected to an outflow side of the distribution flow passage 2a. The header 3 has a joining flow passage 3a formed therein. The plurality of first heat transfer tubes 4 are connected to an inflow side of the joining flow passage 3a. A refrigerant pipe is connected to an outflow side of the joining flow passage 3a.

The first heat transfer tube 4 is a flat tube having a plurality of flow passages formed therein. The first heat transfer tube 4 is made of, for example, aluminum. The plurality of fins 5 are joined to the first heat transfer tubes 4. The fin 5 is made of, for example, aluminum. It is preferred that the first heat transfer tubes 4 and the fins 5 be joined by brazing. Note that, in FIG. 1, there is illustrated a case where eight first heat transfer tubes 4 are provided, but the present invention is not limited to such a case. Further, the first heat transfer tube 4 need not be a flat tube.

<Flow of Refrigerant in Heat Exchanger>

Now, the flow of the refrigerant in the heat exchanger according to Embodiment 1 is described.

The refrigerant flowing through the refrigerant pipe flows into the laminated header 2 to be distributed at the distribution flow passage 2a, and then flows out toward the plurality of first heat transfer tubes 4. In the plurality of first heat transfer tubes 4, the refrigerant exchanges heat with air supplied by a fan, for example. The refrigerant flowing through the plurality of first heat transfer tubes 4 flows into the joining flow passage 3a of the header 3 to be joined, and then flows out toward the refrigerant pipe. The refrigerant can reversely flow.

<Configuration of Laminated Header>

Now, the configuration of the laminated header of the heat exchanger according to Embodiment 1 is described.

Figure 2:
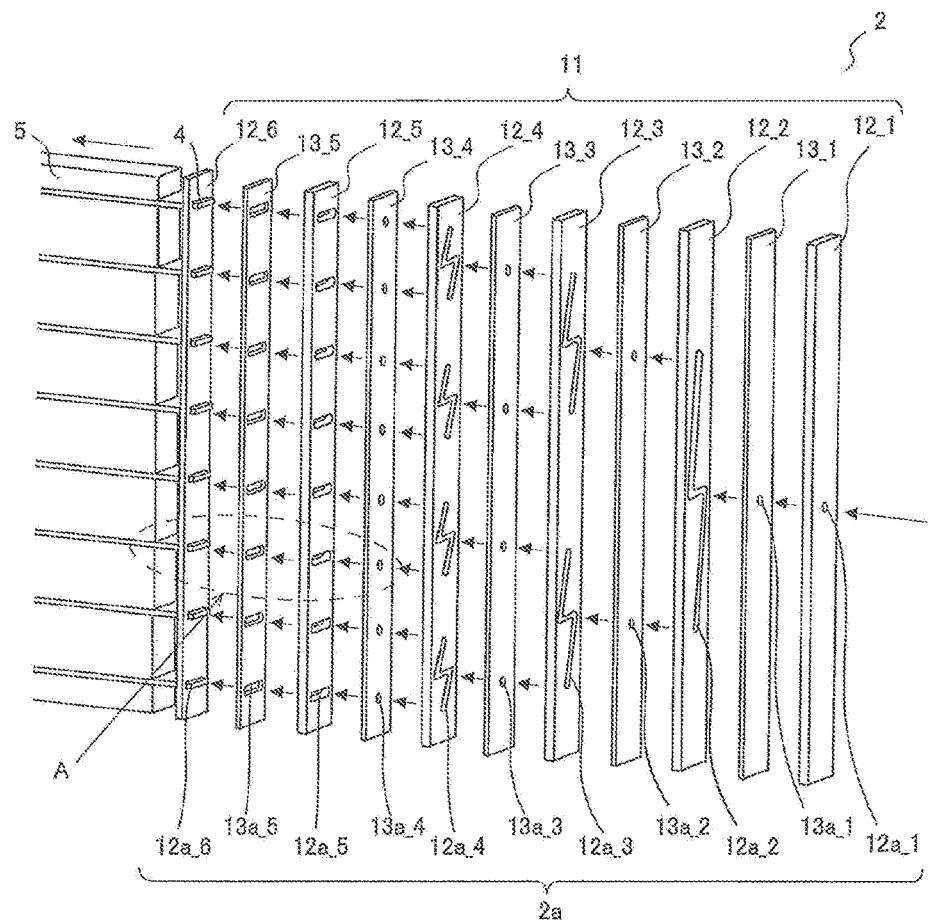
FIG. 2 is a perspective view for illustrating the heat exchanger according to Embodiment 1 under a state in which a laminated header is disassembled.
Figure 3:
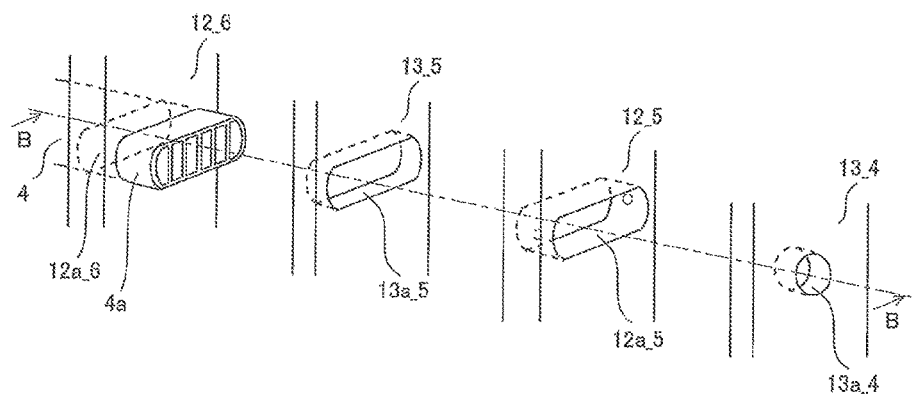
FIG. 3 is a perspective view for illustrating the heat exchanger according to Embodiment 1 under a state in which the laminated header is disassembled.

FIG. 2 and FIG. 3 are perspective views of the heat exchanger according to Embodiment 1 under a state in which the laminated header is disassembled. FIG. 3 is an enlarged perspective view of the portion A of FIG. 2.

As illustrated in FIG. 2, the laminated header 2 includes a plate-like unit 11. The plate-like unit 11 is formed so that bare members 12_1 to 12_6 and cladding members 13_1 to 13_5 are alternately laminated. The bare members 12_1 and 12_6 are laminated on the outermost sides of the plate-like unit 11 in the laminating direction. In the following, in some cases, the bare members 12_1 to 12_6 are collectively referred to as the bare member 12. In the following, in some cases, the cladding members 13_1 to 13_5 are collectively referred to as the cladding member 13.

The bare member 12 is made of, for example, aluminum. No brazing material is applied to the bare member 12. The respective bare members 12 have first distribution flow passages 12a_1 to 12a_6 formed therein. Each of the first distribution flow passages 12a_1 to 12a_6 is a through hole passing through the front and back surfaces of the bare member 12. When the bare members 12 and the cladding members 13 are laminated, the first distribution flow passages 12a_1 to 12a_6 function as parts of the distribution flow passage 2a. In the following, in some cases, the first distribution flow passages 12a_1 to 12a_6 are collectively referred to as the first distribution flow passage 12a.

The cladding member 13 is made of, for example, aluminum, and is thinner than the bare member 12. A brazing material is applied to at least the front and back surfaces of the cladding member 13. The respective cladding members 13 have second distribution flow passages 13a_1 to 13a_5 formed therein. Each of the second distribution flow passages 13a_1 to 13a_5 is a through hole passing through the front and back surfaces of the cladding member 13. When the bare members 12 and the cladding members 13 are laminated, the second distribution flow passages 13a_1 to 13a_5 function as parts of the distribution flow passage 2a. In the following, in some cases, the second distribution flow passages 13a_1 to 13a_5 are collectively referred to as the second distribution flow passage 13a.

Each of the first distribution flow passage 12a_1 formed in the bare member 12_1 and the second distribution flow passages 13a_1 to 13a_4 formed in the cladding members 13_1 to 13_4 is a circular through hole. The refrigerant pipe is connected to the first distribution flow passage 12a_1. For example, a fitting or other such component may be provided on the surface of the bare member 12_1 on the refrigerant inflow side, and the refrigerant pipe may be connected to the first distribution flow passage 12a_1 through the fitting or other such component. Alternatively, the inner peripheral surface of the first distribution flow passage 12a_1 may be shaped to be fitted to the outer peripheral surface of the refrigerant pipe so that the refrigerant pipe may be directly connected to the first distribution flow passage 12a_1 without using the fitting or other such component.

Each of the first distribution flow passages 12a_2 to 12a_4 formed in the bare members 12_2 to 12_4 is, for example, a Z-shaped through hole. The second distribution flow passages 13a_1 to 13a_3 of the cladding members 13_1 to 13_3 laminated on the refrigerant inflow sides of the bare members 12_2 to 12_4 are formed at positions opposed to the centers of the first distribution flow passages 12a_2 to 12a_4, respectively. The second distribution flow passages 13a_2 to 13a_4 of the cladding members 13_2 to 13_4 laminated on the refrigerant outflow sides of the bare members 12_2 to 12_4 are formed at positions opposed to the end portions of the first distribution flow passages 12a_2 to 12a_4, respectively.

When the bare members 12_2 to 12_4 and the cladding members 13_1 to 13_4 are laminated, the first distribution flow passages 12a_2 to 12a_4 are closed except for regions at the centers of the first distribution flow passages 12a_2 to 12a_4, which communicate with the second distribution flow passages 13a_1 to 13a_3, respectively (that is, refrigerant inflow regions), and regions in the first distribution flow passages 12a_2 to 12a_4, which communicate with the second distribution flow passages 13a_2 to 13a_4, respectively (that is, refrigerant outflow regions). As a result, branching flow passages are formed. Note that, in FIG. 2, there is illustrated a case where the distribution flow passage 2a includes a plurality of branching flow passages for branching the refrigerant flowing therein into two flows to cause the refrigerant to flow out therefrom, but the present invention is not limited to such a case.

As illustrated in FIG. 3, each of the first distribution flow passages 12a_5 and 12a_6 formed in the bare members 12_5 and 12_6 and the second distribution flow passage 13a_5 formed in the cladding member 13_5 is a through hole having a shape conforming to the outer peripheral surface of the first heat transfer tube 4. Each of the inner peripheral surfaces of the first distribution flow passages 12a_5 and 12a_6 and the inner peripheral surface of the second distribution flow passage 13a_5 is fitted to the outer peripheral surface of the first heat transfer tube 4. It is preferred that the surfaces be fitted to each other with a gap that allows entry of the heated brazing material due to a capillary phenomenon. Under a state in which the bare members 12 and the cladding members 13 are laminated and the first heat transfer tubes 4 are joined to the plate-like unit 11, an end portion 4a of each of the first heat transfer tubes 4 is positioned on the inner side of the first distribution flow passage 12a_5 of the bare member 12_5. A configuration of the joining portion between the plate-like unit 11 and the first heat transfer tube 4 and a method of joining the plate-like unit 11 and the first heat transfer tube 4 to each other are described later.

<Flow of Refrigerant in Laminated Header>

Now, the flow of the refrigerant in the laminated header of the heat exchanger according to Embodiment 1 is described.

Figure 4:
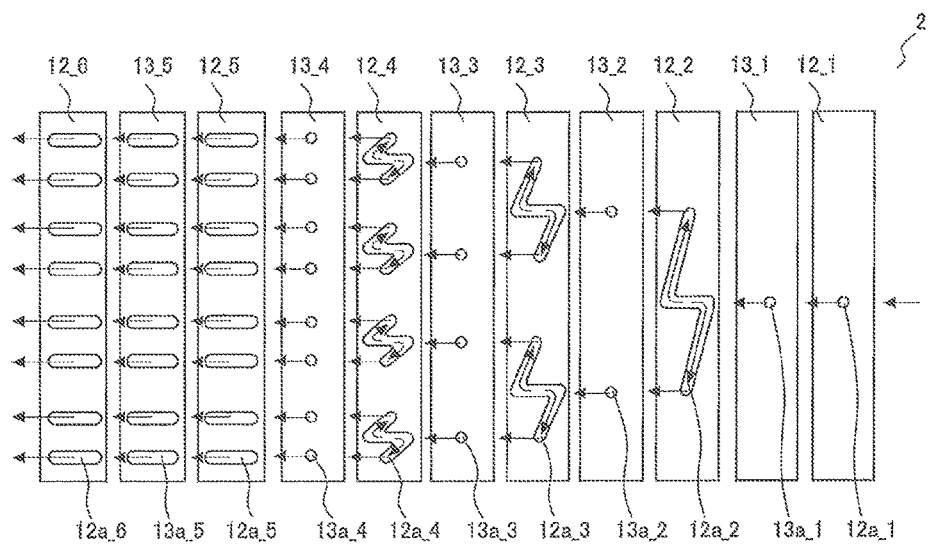
FIG. 4 is a developed view of the laminated header of the heat exchanger according to Embodiment 1.

FIG. 4 is a developed view of the laminated header of the heat exchanger according to Embodiment 1.

As illustrated in FIG. 2 and FIG. 4, the refrigerant passing through the first distribution flow passage 12a_1 of the bare member 12_1 to flow into the second distribution flow passage 13a_1 of the cladding member 13_1 flows into the center of the first distribution flow passage 12a_2 of the bare member 12_2. The refrigerant flowing into the center of the first distribution flow passage 12a_2 of the bare member 12_2 hits against the surface of the cladding member 13_2 laminated adjacent to the bare member 12_2, and is branched to flow into each of the end portions of the first distribution flow passage 12a_2 of the bare member 12_2. The refrigerant flowing out from each of the end portions of the first distribution flow passage 12a_2 of the bare member 12_2 passes through the second distribution flow passage 13a_2 of the cladding member 13_2 to flow into the center of the first distribution flow passage 12a_3 of the bare member 12_3.

Similarly, the refrigerant flowing into the center of the first distribution flow passage 12a_3 of the bare member 12_3 hits against the surface of the cladding member 13_3 laminated adjacent to the bare member 12_3, and is branched to flow into each of the end portions of the first distribution flow passage 12a_3 of the bare member 12_3. The refrigerant flowing out from each of the end portions of the first distribution flow passage 12a_3 of the bare member 12_3 passes through the second distribution flow passage 13a_3 of the cladding member 13_3 to flow into the center of the first distribution flow passage 12a_4 of the bare member 12_4.

Similarly, the refrigerant flowing into the center of the first distribution flow passage 12a_4 of the bare member 12_4 hits against the surface of the cladding member 13_4 laminated adjacent to the bare member 12_4, and is branched to flow into each of the end portions of the first distribution flow passage 12a_4 of the bare member 12_4. The refrigerant flowing out from each of the end portions of the first distribution flow passage 12a_4 of the bare member 12_4 passes through the second distribution flow passage 13a_4 of the cladding member 13_4 to flow into the first distribution flow passage 12a_5 of the bare member 12_5.

The refrigerant flowing into the first distribution flow passage 12a_5 of the bare member 12_5 flows into the first heat transfer tube 4 through the end portion 4a of the first heat transfer tube 4, which is positioned on the inner side of the first distribution flow passage 12a_5. The refrigerant flowing into the first heat transfer tube 4 passes through regions in the first heat transfer tube 4, which are positioned on the inner side of the second distribution flow passage 13a_5 of the cladding member 13_5 and on the inner side of the first distribution flow passage 12a_6 of the bare member 12_6, to thereby flow into a region in the first heat transfer tube 4, in which the fins 5 are joined.

<Configuration of Joining Portion Between Plate-Like Unit and First Heat Transfer Tube>

Now, the configuration of the joining portion between the plate-like unit and the first heat transfer tube of the heat exchanger according to Embodiment 1 is described.

Figure 5:
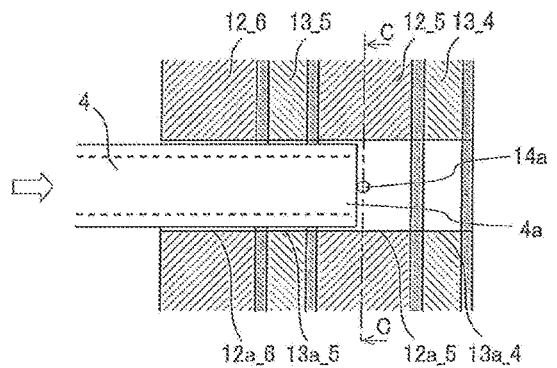
FIG. 5 are views for illustrating a configuration of a joining portion between a plate-like unit and a first heat transfer tube of the heat exchanger according to Embodiment 1.
Figure 5:
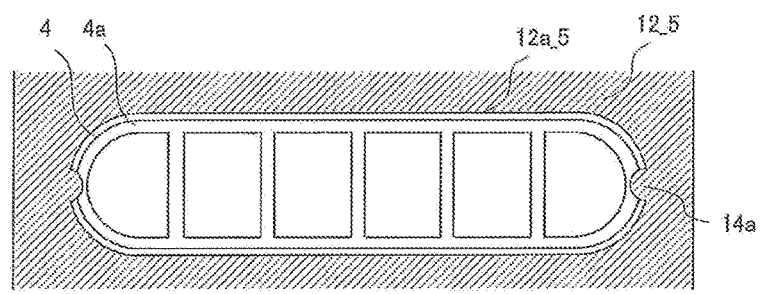

FIG. 5 are views for illustrating the configuration of the joining portion between the plate-like unit and the first heat transfer tube of the heat exchanger according to Embodiment 1. FIG. 5(a) is a sectional view taken along the line B-B of FIG. 3, for illustrating the state in which the bare members 12 and the cladding members 13 are laminated and the first heat transfer tube 4 is joined to the plate-like unit 11. FIG. 5(b) is a sectional view taken along the line C-C of FIG. 5(a), for illustrating the state in which the bare members 12 and the cladding members 13 are laminated and the first heat transfer tube 4 is joined to the plate-like unit 11. Note that, in FIG. 5(a), there is illustrated a state in which the brazing material is not applied to the inner peripheral surface of the second distribution flow passage 13a, but the brazing material may be applied to the inner peripheral surface of the second distribution flow passage 13a.

As illustrated in FIG. 5, projections 14a are formed on the inner peripheral surface of the first distribution flow passage 12a_5 of the bare member 12_5. The first heat transfer tube 4 is joined under a state in which the end portion 4a is brought into abutment against the projections 14a. Note that, in FIG. 5, there is illustrated a case where the projections 14a are formed at both end portions of the first distribution flow passage 12a_5 in a longitudinal direction thereof, but the present invention is not limited to such a case. The projections 14a may be formed at both end portions of the first distribution flow passage 12a_5 in a transverse direction thereof, or the projections 14a may be formed at both the end portions of the first distribution flow passage 12a_5 in the longitudinal direction and both the end portions of the first distribution flow passage 12a_5 in the transverse direction. Further, in FIG. 5, there is illustrated a case where two projections 14a are formed, but the present invention is not limited to such a case. A different number of projections 14a may be formed instead. Still further, in FIG. 5, there is illustrated a case where each of the projections 14a has a semispherical shape, but the present invention is not limited to such a case. Each of the projections 14a may have a different shape instead.

The projection 14a is formed between both end portions of the inner peripheral surface of the first distribution flow passage 12a_5. That is, the projection 14a is formed at a position spaced away from the front surface and the back surface of the bare member 12_5. Further, the height of the projection 14a is smaller than the thickness of the first heat transfer tube 4. That is, the distal end of the projection 14a is not projected to the inner side of the inner peripheral surface of the first heat transfer tube 4 under a state in which the end portion 4a of the first heat transfer tube 4 is viewed from the inner side of the first heat transfer tube 4.

<Method of Joining Plate-like Unit and First Heat Transfer Tube to Each Other>

Now, the method of joining the plate-like unit and the first heat transfer tube of the heat exchanger according to Embodiment 1 to each other is described.

The plate-like unit 11 and the first heat transfer tube 4 are heated under a state in which the first heat transfer tube 4 is positioned so that the end portion 4a is brought into abutment against the projections 14a as illustrated in FIG. 5. As a result, the temperature of the brazing material applied to the cladding member 13 becomes equal to or higher than the melting point so that the brazing material is melted. Due to the capillary phenomenon, the melted brazing material flows into the gap between the outer peripheral surface of the first heat transfer tube 4 and each of the inner peripheral surfaces of the first distribution flow passages 12a_5 and 12a_6, and into the gap between the outer peripheral surface of the first heat transfer tube 4 and the second distribution flow passage 13a_5. When the heating of the plate-like unit 11 and the first heat transfer tube 4 is finished and then the brazing material is cooled, the plate-like unit 11 and the first heat transfer tube 4 are joined to each other.

At the time of heating the plate-like unit 11 and the first heat transfer tube 4, it is preferred that fluid be supplied from the inner side of the first heat transfer tube 4 toward the end portion 4a of the first heat transfer tube 4 as indicated by the white arrow in FIG. 5. It is also preferred that the temperature of the fluid be higher than the melting point of the brazing material. In such a case, inhibition of the melt of the brazing material is suppressed. Further, it is preferred that the fluid be air. In such a case, the process can be simplified by diverting the use of general-purpose equipment.

Note that, when all the members to be joined by brazing, including the bare member 12, the cladding member 13, the first heat transfer tube 4, and the fin 5, are made of the same material (for example, aluminum), those members can be collectively joined by brazing, thereby enhancing the productivity. The above description is directed to a case where the first heat transfer tubes 4, all the bare members 12, and all the cladding members 13 are collectively joined by brazing, but the present invention is not limited to such a case. For example, the first heat transfer tubes 4 and the bare member 12_6 may be first joined by brazing or other methods, and the remaining bare members 12_1 to 12_5 and all the cladding members 13 may be joined by brazing afterwards. Alternatively, the first heat transfer tubes 4, the bare members 12_5 and 12_6, and the cladding member 13_5 may be first joined by brazing, and the remaining bare members 12_1 to 12_4 and the remaining cladding members 13_1 to 13_4 may be joined by brazing afterwards.

<Usage Mode of Heat Exchanger>

Now, an example of a usage mode of the heat exchanger according to Embodiment 1 is described.

Note that, in the following, there is described a case where the heat exchanger according to Embodiment 1 is used for an air-conditioning apparatus, but the present invention is not limited to such a case, and for example, the heat exchanger according to Embodiment 1 may be used for other refrigeration cycle apparatus including a refrigerant circuit. Further, there is described a case where the air-conditioning apparatus switches between a cooling operation and a heating operation, but the present invention is not limited to such a case, and the air-conditioning apparatus may perform only the cooling operation or the heating operation.

Figure 6:
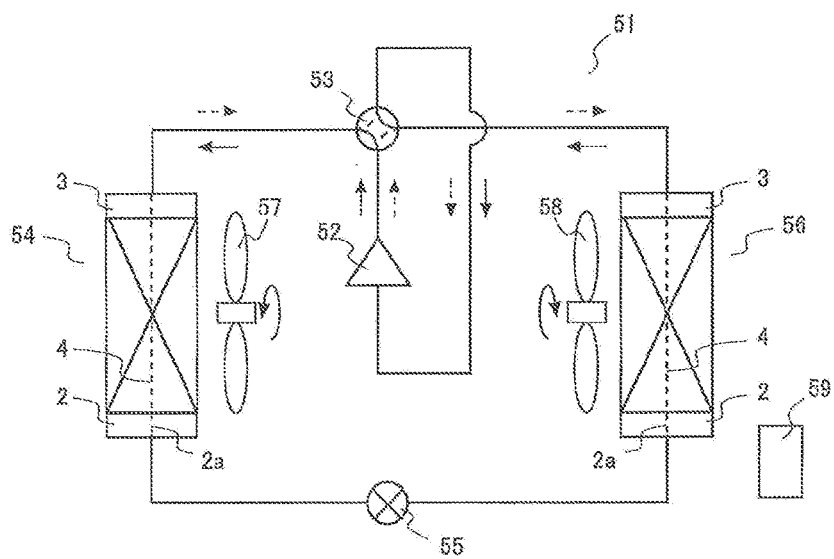
FIG. 6 is a diagram for illustrating a configuration of an air-conditioning apparatus to which the heat exchanger according to Embodiment 1 is applied.

FIG. 6 is a diagram for illustrating the configuration of the air-conditioning apparatus to which the heat exchanger according to Embodiment 1 is applied. Note that, in FIG. 6, the direction of the flow of the refrigerant during the cooling operation is indicated by the solid arrow, while the direction of the flow of the refrigerant during the heating operation is indicated by the dotted arrow.

As illustrated in FIG. 6, an air-conditioning apparatus 51 includes a compressor 52, a four-way valve 53, a heat source-side heat exchanger 54, an expansion device 55, a load-side heat exchanger 56, a heat source-side fan 57, a load-side fan 58, and a controller 59. The compressor 52, the four-way valve 53, the heat source-side heat exchanger 54, the expansion device 55, and the load-side heat exchanger 56 are connected by refrigerant pipes to form a refrigerant circuit.

The controller 59 is connected to, for example, the compressor 52, the four-way valve 53, the expansion device 55, the heat source-side fan 57, the load-side fan 58, and various sensors. The controller 59 switches the flow passage of the four-way valve 53 to switch between the cooling operation and the heating operation. The heat source-side heat exchanger 54 acts as a condenser during the cooling operation, and acts as an evaporator during the heating operation. The load-side heat exchanger 56 acts as the evaporator during the cooling operation, and acts as the condenser during the heating operation.

The flow of the refrigerant during the cooling operation is described.

The refrigerant in a high-pressure and high-temperature gas state discharged from the compressor 52 passes through the four-way valve 53 to flow into the heat source-side heat exchanger 54, and is condensed through heat exchange with the outside air supplied by the heat source-side fan 57, to thereby become the refrigerant in a high-pressure liquid state, which flows out from the heat source-side heat exchanger 54. The refrigerant in the high-pressure liquid state flowing out from the heat source-side heat exchanger 54 flows into the expansion device 55 to become the refrigerant in a low-pressure two-phase gas-liquid state. The refrigerant in the low-pressure two-phase gas-liquid state flowing out from the expansion device 55 flows into the load-side heat exchanger 56 to be evaporated through heat exchange with indoor air supplied by the load-side fan 58, to thereby become the refrigerant in a low-pressure gas state, which flows out from the load-side heat exchanger 56. The refrigerant in the low-pressure gas state flowing out from the load-side heat exchanger 56 passes through the four-way valve 53 to be sucked into the compressor 52.

The flow of the refrigerant during the heating operation is described.

The refrigerant in a high-pressure and high-temperature gas state discharged from the compressor 52 passes through the four-way valve 53 to flow into the load-side heat exchanger 56, and is condensed through heat exchange with the indoor air supplied by the load-side fan 58, to thereby become the refrigerant in a high-pressure liquid state, which flows out from the load-side heat exchanger 56. The refrigerant in the high-pressure liquid state flowing out from the load-side heat exchanger 56 flows into the expansion device 55 to become the refrigerant in a low-pressure two-phase gas-liquid state. The refrigerant in the low-pressure two-phase gas-liquid state flowing out from the expansion device 55 flows into the heat source-side heat exchanger 54 to be evaporated through heat exchange with the outside air supplied by the heat source-side fan 57, to thereby become the refrigerant in a low-pressure gas state, which flows out from the heat source-side heat exchanger 54. The refrigerant in the low-pressure gas state flowing out from the heat source-side heat exchanger 54 passes through the four-way valve 53 to be sucked into the compressor 52.

The heat exchanger 1 is used for at least one of the heat source-side heat exchanger 54 or the load-side heat exchanger 56. When the heat exchanger 1 acts as the evaporator, the heat exchanger 1 is connected so that the refrigerant flows in from the laminated header 2 and the refrigerant flows out from the header 3. In other words, when the heat exchanger 1 acts as the evaporator, the refrigerant in the two-phase gas-liquid state passes through the refrigerant pipe to flow into the laminated header 2, and the refrigerant in the gas state passes through the first heat transfer tube 4 to flow into the header 3. Further, when the heat exchanger 1 acts as the condenser, the refrigerant in the gas state passes through the refrigerant pipe to flow into the header 3, and the refrigerant in the liquid state passes through the first heat transfer tube 4 to flow into the laminated header 2.

The laminated header 2 distributes the refrigerant through the plurality of branching flow passages. Therefore, even when the refrigerant in the two-phase gas-liquid state flows into the laminated header 2, the flow rate and the quality of the refrigerant flowing into each of the plurality of first heat transfer tubes 4 can be equalized. That is, the laminated header 2 is suited to the refrigeration cycle apparatus such as the air-conditioning apparatus 51.

<Actions of Heat Exchanger>

Now, actions of the heat exchanger according to Embodiment 1 are described.

In the laminated header 2, the bare members 12_1 and 12_6 with no brazing material being applied thereto are laminated on the outermost sides of the plate-like unit 11 in the laminating direction, that is, the brazing material is not applied to the outermost surfaces of the plate-like unit 11 in the laminating direction. Thus, the usage amount of the brazing material is reduced. Further, the configuration in which the brazing material is not applied to the outermost surfaces of the plate-like unit 11 in the laminating direction suppresses the phenomenon that, at the time of heating, the brazing material enters the gap between the first heat transfer tube 4 and the first distribution flow passage 12a and the gap between the first heat transfer tube 4 and the second distribution flow passage 13a to reach the end portion 4a of the first heat transfer tube 4 and flow into the flow passage of the refrigerant. Thus, the increase of the pressure loss of the refrigerant is suppressed.

Further, in the laminated header 2, the bare member 12 is thicker than the cladding member 13, and the first heat transfer tube 4 is joined under a state in which the end portion 4a is positioned between the front surface and the back surface of the bare member 12_5. Thus, the distance between each of the front and back surfaces of the cladding member 13 and the end portion 4a can be increased, thereby suppressing the increase of the pressure loss of the refrigerant, which may be caused by the inflow of the melted brazing material into the first heat transfer tube 4. Besides, the distance in the region where the outer peripheral surface of the first heat transfer tube 4 and the inner peripheral surface of the first distribution flow passage 12a_5 of the bare member 12_5 are oppose to each other in the thickness direction can be increased, thereby being capable of ensuring the positioning and retaining of the periphery of the end portion 4a of the first heat transfer tube 4 before the heating. Note that, similar actions are attained even when the laminated header 2 is constructed such that the cladding member 13 with the brazing material being applied thereto is laminated on the outermost side of the plate-like unit 11 in the laminating direction, that is, the brazing material is applied to the outermost surface of the plate-like unit 11 in the laminating direction.

Further, in the laminated header 2, the projections 14a are formed on the inner peripheral surface of the first distribution flow passage 12a_5. This configuration suppresses the phenomenon that the gap between the fin 5 and the laminated header 2 is reduced due to excessive insertion of the first heat transfer tube 4 to degrade the heat exchange efficiency. Besides, there is no need to elongate the first heat transfer tube 4 more than necessary against the risk of excessive insertion of the first heat transfer tube 4, thereby being capable of downsizing the heat exchanger 1.

Further, in the laminated header 2, the first heat transfer tube 4 is joined under a state in which the end portion 4a is brought into abutment against the projections 14a and the outer peripheral surface of the end portion 4a is fitted to the inner peripheral surface of the first distribution flow passage 12a_5. In the related-art laminated header, gaps for suppressing the inflow of the brazing material are formed between the outer peripheral surface of the end portion of the first heat transfer tube and the inner peripheral surface of the first flow passage, but the pressure loss of the refrigerant at the inlet of the passage of the tube is increased due to the inflow of the refrigerant into the gaps. In the laminated header 2, only the gap that allows the inflow of the brazing material due to the capillary phenomenon is formed between the outer peripheral surface of the end portion 4a and the inner peripheral surface of the first distribution flow passage 12a_5, thereby suppressing the increase of the pressure loss of the refrigerant, which may be caused by the inflow of the refrigerant into the gap. Besides, it is possible to ensure the positioning and retaining of the periphery of the end portion 4a of the first heat transfer tube 4 before the heating. Note that, similar actions are attained even when the laminated header 2 is constructed such that the cladding member 13 with the brazing material being applied thereto is laminated on the outermost side of the plate-like unit 11 in the laminating direction, that is, the brazing material is applied to the outermost surface of the plate-like unit 11 in the laminating direction.

Further, in the laminated header 2, the distal end of the projection 14a is not projected to the inner side of the inner peripheral surface of the first heat transfer tube 4 under the state in which the end portion 4a of the first heat transfer tube 4 is viewed from the inner side of the first heat transfer tube 4. Thus, the increase of the pressure loss of the refrigerant, which may be caused by the projection 14a, is suppressed.

Further, in the laminated header 2, the plate-like unit 11 and the first heat transfer tube 4 are joined under the state in which the fluid is supplied from the inner side of the first heat transfer tube 4 toward the end portion 4a of the first heat transfer tube 4. Thus, the increase of the pressure loss of the refrigerant, which may be caused by the inflow of the melted brazing material into the first heat transfer tube 4, is suppressed. Note that, similar actions are attained even when the laminated header 2 is constructed such that the cladding member 13 with the brazing material being applied thereto is laminated on the outermost side of the plate-like unit 11 in the laminating direction, that is, the brazing material is applied to the outermost surface of the plate-like unit 11 in the laminating direction.

Modified Example

Figure 7:
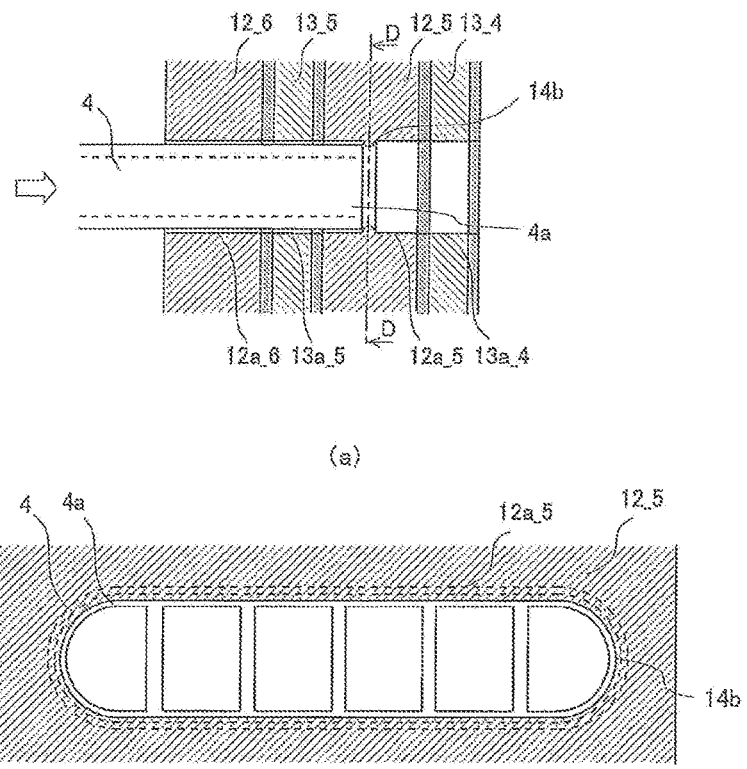
FIG. 7 are views for illustrating a configuration of the joining portion between the plate-like unit and the first heat transfer tube in a modified example of the heat exchanger according to Embodiment 1.
Figure 7:
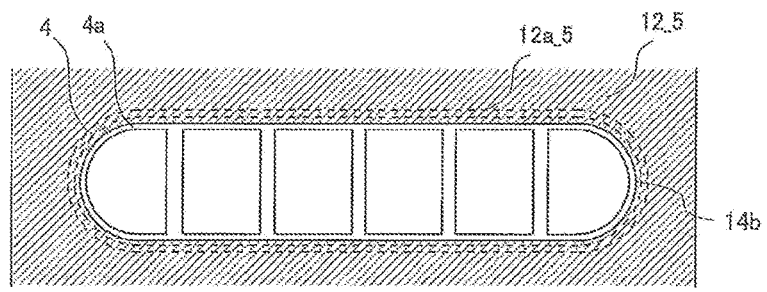

FIG. 7 are views for illustrating a configuration of the joining portion between the plate-like unit and the first heat transfer tube in a modified example of the heat exchanger according to Embodiment 1. Note that, FIG. 7(a) is a sectional view taken along the line B-B of FIG. 3, for illustrating the state in which the bare members 12 and the cladding members 13 are laminated and the first heat transfer tube 4 is joined to the plate-like unit 11. FIG. 7(b) is a sectional view taken along the line D-D of FIG. 7(a), for illustrating the state in which the bare members 12 and the cladding members 13 are laminated and the first heat transfer tube 4 is joined to the plate-like unit 11.

As illustrated in FIG. 7, a projection 14b is formed on the inner peripheral surface of the first distribution flow passage 12a_5 of the bare member 12_5 so as to extend over the entire region of the inner peripheral surface in a circumferential direction thereof. Note that, in FIG. 7, there is illustrated a case where the projection 14b has a semicircular shape in cross section, but the present invention is not limited to such a case. The projection 14b may have a different shape instead.

The projection 14b is formed between both the end portions of the inner peripheral surface of the first distribution flow passage 12a_5. That is, the projection 14b is formed at a position spaced away from the front surface and the back surface of the bare member 12_5. Further, the height of the projection 14b is smaller than the thickness of the first heat transfer tube 4. That is, the distal end of the projection 14b is not projected to the inner side of the inner peripheral surface of the first heat transfer tube 4 under the state in which the end portion 4a of the first heat transfer tube 4 is viewed from the inner side of the first heat transfer tube 4.

Compared to the projection 14a, the projection 14b can disperse the load to be generated when the first heat transfer tube 4 is brought into abutment against the projection 14b. Thus, the reliability of positioning of the first heat transfer tube 4 is enhanced. Further, compared to the projection 14a, the projection 14b is easily processed, and is also easily molded by casting or other methods. Thus, the manufacturing cost of the bare member 12_5 is reduced.

Embodiment 2

A heat exchanger according to Embodiment 2 is described.

Note that, overlapping description or similar description to that of Embodiment 1 is appropriately simplified or omitted.

<Configuration of Heat Exchanger>

Now, the configuration of the heat exchanger according to Embodiment 2 is described.

Figure 8:
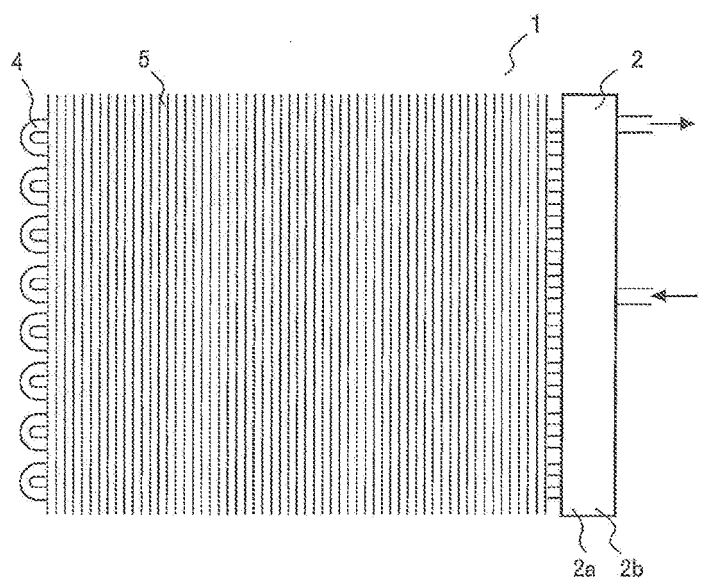
FIG. 8 is a view for illustrating a configuration of a heat exchanger according to Embodiment 2.

FIG. 8 is a view for illustrating the configuration of the heat exchanger according to Embodiment 2.

As illustrated in FIG. 8, the heat exchanger 1 includes the laminated header 2, the plurality of first heat transfer tubes 4, and the plurality of fins 5.

The laminated header 2 has the distribution flow passage 2a and a joining flow passage 2b formed therein. The plurality of first heat transfer tubes 4 are connected to an inflow side of the joining flow passage 2b. A refrigerant pipe is connected to an outflow side of the joining flow passage 2b. The first heat transfer tube 4 is a flat tube subjected to hair-pin bending. The plurality of first heat transfer tubes 4 are connected between the outflow side of the distribution flow passage 2a and the inflow side of the joining flow passage 2b.

<Flow of Refrigerant in Heat Exchanger>

Now, the flow of the refrigerant in the heat exchanger according to Embodiment 2 is described.

The refrigerant flowing through the refrigerant pipe flows into the laminated header 2 to be distributed at the distribution flow passage 2a, and then flows out toward the plurality of first heat transfer tubes 4. In the plurality of first heat transfer tubes 4, the refrigerant exchanges heat with air supplied by a fan, for example. The refrigerant flowing through the plurality of first heat transfer tubes 4 flows into the joining flow passage 2b of the laminated header 2 to be joined, and then flows out toward the refrigerant pipe. The refrigerant can reversely flow.

<Configuration of Laminated Header>

Now, the configuration of the laminated header of the heat exchanger according to Embodiment 2 is described.

Figure 9:
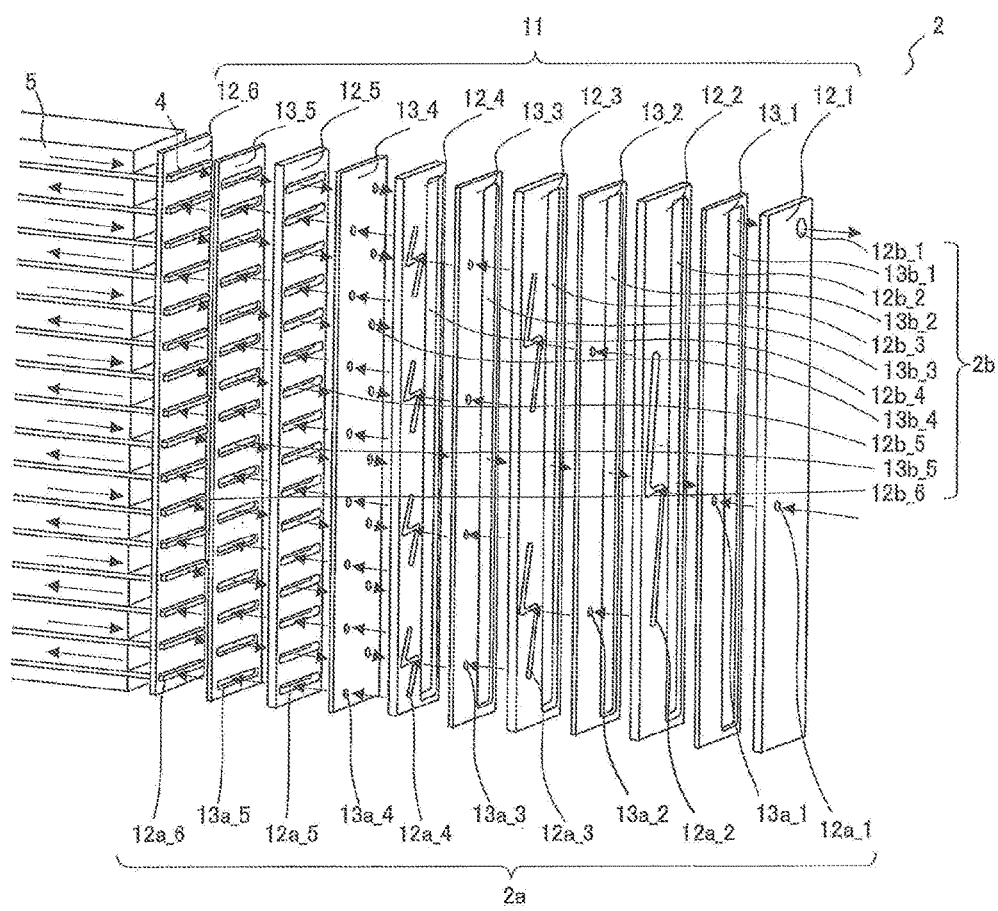
FIG. 9 is a perspective view for illustrating the heat exchanger according to Embodiment 2 under a state in which the laminated header is disassembled.

FIG. 9 is a perspective view of the heat exchanger according to Embodiment 2 under a state in which the laminated header is disassembled.

As illustrated in FIG. 9, the respective bare members 12 have first joining flow passages 12b_1 to 12b_6 formed therein. Each of the first joining flow passages 12b_1 to 12b_6 is a through hole passing through the front and back surfaces of the bare member 12. When the bare members 12 and the cladding members 13 are laminated, the first joining flow passages 12b_1 to 12b_6 function as parts of the joining flow passage 2b. In the following, in some cases, the first joining flow passages 12b_1 to 12b_6 are collectively referred to as the first joining flow passage 12b.

Further, the respective cladding members 13 have second joining flow passages 13b_1 to 13b_5 formed therein. Each of the second joining flow passages 13b_1 to 13b_5 is a through hole passing through the front and back surfaces of the cladding member 13. When the bare members 12 and the cladding members 13 are laminated, the second joining flow passages 13b_1 to 13b_5 function as parts of the joining flow passage 2b. In the following, in some cases, the second joining flow passages 13b_1 to 13b_5 are collectively referred to as the second joining flow passage 13b.

Each of the first joining flow passage 12b_1 formed in the bare member 12_1 and the second joining flow passage 13b_4 formed in the cladding member 13_4 is a circular through hole. The refrigerant pipe is connected to the first joining flow passage 12b_1. For example, a fitting or other such component may be provided on the surface of the bare member 12_1 on the refrigerant outflow side, and the refrigerant pipe may be connected to the first joining flow passage 12b_1 through the fitting or other such component. Alternatively, the inner peripheral surface of the first joining flow passage 12b_1 may be shaped to be fitted to the outer peripheral surface of the refrigerant pipe so that the refrigerant pipe may be directly connected to the first joining flow passage 12b_1 without using the fitting or other such component.

Each of the first joining flow passages 12b_2 to 12b_4 formed in the bare members 12_2 to 12_4 and the second joining flow passages 13b_1 to 13b_3 formed in the cladding members 13_1 to 13_3 is, for example, a rectangular through hole passing through a substantially entire region of the bare member 12 or the cladding member 13 in a height direction thereof. Note that, in FIG. 9, there is illustrated a case where the joining flow passage 2b joins the flows of the refrigerant flowing therein into one flow to cause the refrigerant to flow out therefrom, but the present invention is not limited to such a case.

Each of the first joining flow passages 12b_5 and 12b_6 formed in the bare members 12_5 and 12_6 and the second joining flow passage 13b_5 formed in the cladding member 13_5 is a through hole having a shape conforming to the outer peripheral surface of the first heat transfer tube 4. Each of the inner peripheral surfaces of the first joining flow passages 12b_5 and 12b_6 and the inner peripheral surface of the second joining flow passage 13b_5 is fitted to the outer peripheral surface of the first heat transfer tube 4. It is preferred that the surfaces be fitted to each other with a gap that allows entry of the heated brazing material due to the capillary phenomenon. Under the state in which the bare members 12 and the cladding members 13 are laminated and the first heat transfer tubes 4 are joined to the plate-like unit 11, the end portion 4a of each of the first heat transfer tubes 4 is positioned on the inner side of the first joining flow passage 12b_5 of the bare member 12_5. A configuration of the joining portion between the plate-like unit 11 and the first heat transfer tube 4 and a method of joining the plate-like unit 11 and the first heat transfer tube 4 to each other are described later.

<Flow of Refrigerant in Laminated Header>

Now, the flow of the refrigerant in the laminated header of the heat exchanger according to Embodiment 2 is described.

Figure 10:
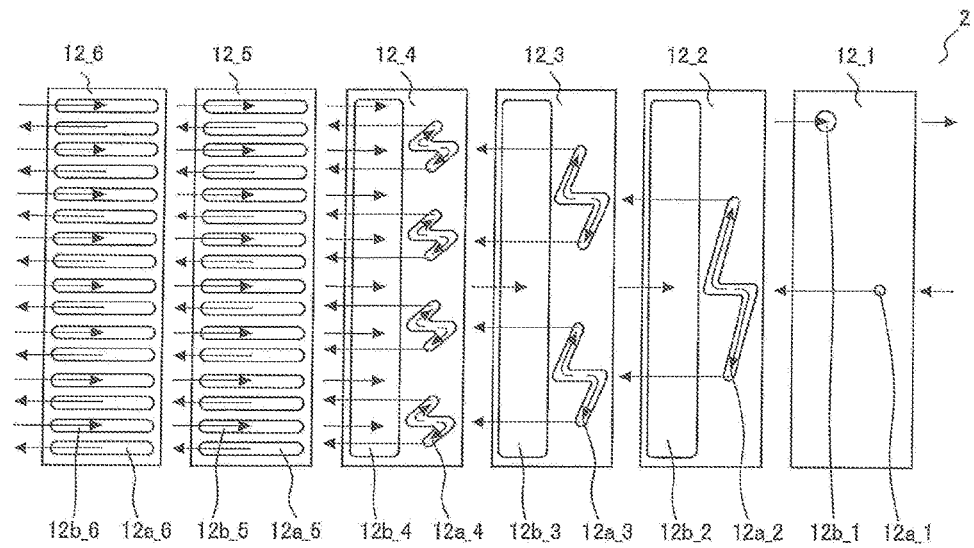
FIG. 10 is a developed view of the laminated header of the heat exchanger according to Embodiment 2.

FIG. 10 is a developed view of the laminated header of the heat exchanger according to Embodiment 2. Note that, in FIG. 10, the illustration of the cladding members 13 is omitted.

As illustrated in FIG. 9 and FIG. 10, each of the flows of the refrigerant flowing into the first heat transfer tubes 4 passes through regions in each of the first heat transfer tubes 4, which are positioned on the inner side of the first joining flow passage 12b_6 of the bare member 12_6 and on the inner side of the second joining flow passage 13b_5 of the cladding member 13_5, to thereby flow into the first joining flow passage 12b_5 of the bare member 12_5. The flows of the refrigerant each flowing into the first joining flow passage 12b_5 of the bare member 12_5 pass through the first joining flow passages 12b_2 to 12b_4 of the bare members 12_2 to 12_4 and the second joining flow passages 13b_1 to 13b_4 of the cladding members 13_1 to 13_4 to be joined, and then the refrigerant flows out toward the refrigerant pipe.

<Configuration of Joining Portion Between Plate-Like Unit and First Heat Transfer Tube>

Now, the configuration of the joining portion between the plate-like unit and the first heat transfer tube of the heat exchanger according to Embodiment 2 is described.

Similarly to FIG. 5 or FIG. 7, the projections 14a or the projection 14b are/is formed on the inner peripheral surface of the first joining flow passage 12b_5 of the bare member 12_5, and the first heat transfer tube 4 is joined under the state in which the end portion 4a is brought into abutment against the projections 14a or the projection 14b.

<Method of Joining Plate-Like Unit and First Heat Transfer Tube to Each Other>

Now, the method of joining the plate-like unit and the first heat transfer tube of the heat exchanger according to Embodiment 2 to each other is described.

Similarly to FIG. 5 or FIG. 7, the plate-like unit 11 and the first heat transfer tube 4 are heated under the state in which the first heat transfer tube 4 is positioned so that the end portion 4a is brought into abutment against the projections 14a or the projection 14b.

At the time of heating the plate-like unit 11 and the first heat transfer tube 4, it is preferred that fluid be supplied from the inner side of the first heat transfer tube 4 toward the end portion 4a of the first heat transfer tube 4 similarly to the white arrow in FIG. 5. Unlike the laminated header 2 described in Embodiment 1, the end portions 4a of the first heat transfer tube 4 on both sides are joined to the single bare member 12_5. Therefore, when all the members to be joined by brazing, including the bare member 12, the cladding member 13, the first heat transfer tube 4, and the fin 5, are collectively joined by brazing, the fluid cannot be supplied from the inner side of the first heat transfer tube 4 toward the end portions 4a of the first heat transfer tube 4 on both sides, but the fluid directed from the inner side of the first heat transfer tube 4 toward the end portion 4a of the first heat transfer tube 4 is supplied to only one of the first distribution flow passage 12a_5 and the first joining flow passage 12b_5. Even in such a case, the pressure loss, which may be caused when the refrigerant passes through the one of the flow passages, can be reduced.

Further, when the first heat transfer tubes 4, the bare members 12_5 and 12_6, and the cladding member 13_5 are first joined by brazing and the remaining bare members 12_1 to 12_4 and the remaining cladding members 13_1 to 13_4 are joined by brazing afterwards, the end portions 4a of each of the first heat transfer tubes 4 on both sides are joined under an exposed state. In such a case, some of the plurality of flow passages of the first heat transfer tube 4 are caused to function as flow passages for supplying the fluid directed from the inner side of the first heat transfer tube 4 toward the end portion 4a of the first heat transfer tube 4, which is positioned on the inner side of the first distribution flow passage 12a_5, whereas the rest of the plurality of flow passages of the first heat transfer tube 4 are caused to function as flow passages for supplying the fluid directed from the inner side of the first heat transfer tube 4 toward the end portion 4a of the first heat transfer tube 4, which is positioned on the inner side of the first joining flow passage 12b_5. Thus, the fluid directed from the inner side of the first heat transfer tube 4 toward the end portion 4a of the first heat transfer tube 4 can be supplied to both of the first distribution flow passage 12a_5 and the first joining flow passage 12b_5.

<Usage Mode of Heat Exchanger>

Now, an example of a usage mode of the heat exchanger according to Embodiment 2 is described.

Figure 11:
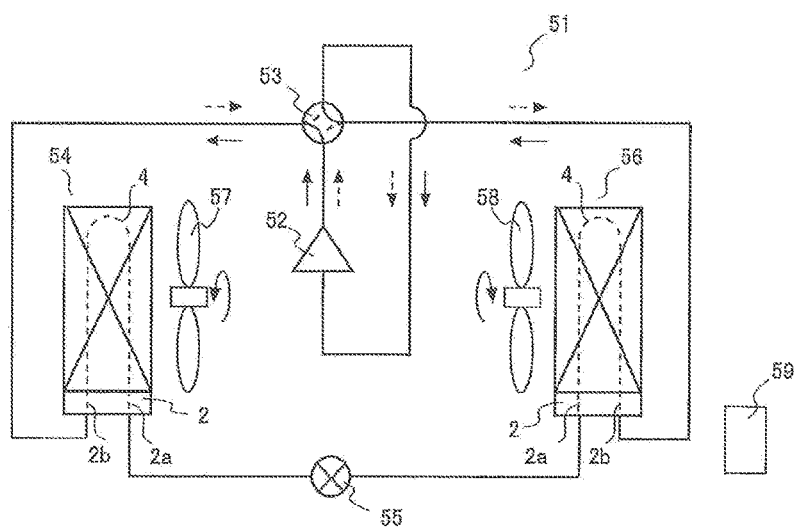
FIG. 11 is a diagram for illustrating a configuration of an air-conditioning apparatus to which the heat exchanger according to Embodiment 2 is applied.

FIG. 11 is a diagram for illustrating a configuration of an air-conditioning apparatus to which the heat exchanger according to Embodiment 2 is applied.

As illustrated in FIG. 11, the heat exchanger 1 is used for at least one of the heat source-side heat exchanger 54 or the load-side heat exchanger 56. When the heat exchanger 1 acts as the evaporator, the heat exchanger 1 is connected so that the refrigerant passes through the distribution flow passage 2a of the laminated header 2 to flow into the first heat transfer tube 4, and the refrigerant passes through the first heat transfer tube 4 to flow into the joining flow passage 2b of the laminated header 2. In other words, when the heat exchanger 1 acts as the evaporator, the refrigerant in a two-phase gas-liquid state passes through the refrigerant pipe to flow into the distribution flow passage 2a of the laminated header 2, and the refrigerant in a gas state passes through the first heat transfer tube 4 to flow into the joining flow passage 2b of the laminated header 2. Further, when the heat exchanger 1 acts as the condenser, the refrigerant in a gas state passes through the refrigerant pipe to flow into the joining flow passage 2b of the laminated header 2, and the refrigerant in a liquid state passes through the first heat transfer tube 4 to flow into the distribution flow passage 2a of the laminated header 2.

<Actions of Heat Exchanger>

Now, actions of the heat exchanger according to Embodiment 2 are described.

In the laminated header 2, the plate-like unit 11 has the joining flow passage 2b formed therein. Therefore, the header 3 is unnecessary, and thus the component cost and the like of the heat exchanger 1 are reduced. Further, the header 3 is unnecessary, and accordingly, it is possible to extend the first heat transfer tube 4 to increase the mounting volume of the fins 5.

Embodiment 3

A heat exchanger according to Embodiment 3 is described.

Note that, overlapping description or similar description to that of each of Embodiment 1 and Embodiment 2 is appropriately simplified or omitted.

<Configuration of Heat Exchanger>

Now, the configuration of the heat exchanger according to Embodiment 3 is described.

Figure 12:
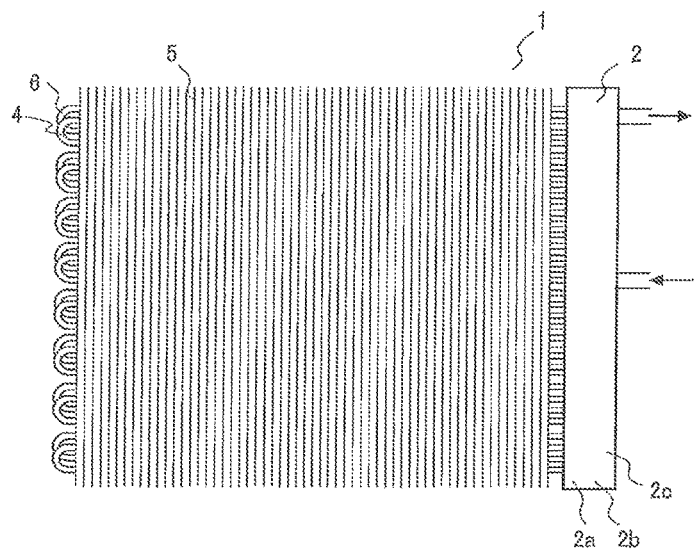
FIG. 12 is a view for illustrating a configuration of a heat exchanger according to Embodiment 3.

FIG. 12 is a view for illustrating the configuration of the heat exchanger according to Embodiment 3.

As illustrated in FIG. 12, the heat exchanger 1 includes the laminated header 2, the plurality of first heat transfer tubes 4, a plurality of second heat transfer tubes 6, and the plurality of fins 5.

The laminated header 2 has the distribution flow passage 2a, the joining flow passage 2b, and a turn-back flow passage 2c formed therein. The plurality of first heat transfer tubes 4 are connected to an inflow side of the turn-back flow passage 2c. The plurality of second heat transfer tubes 6 are connected to an outflow side of the turn-back flow passage 2c. The plurality of second heat transfer tubes 6 are connected to the inflow side of the joining flow passage 2b. The refrigerant pipe is connected to the outflow side of the joining flow passage 2b. The first heat transfer tube 4 and the second heat transfer tube 6 are flat tubes subjected to hair-pin bending. The plurality of first heat transfer tubes 4 are connected between the outflow side of the distribution flow passage 2a and the inflow side of the turn-back flow passage 2c. The plurality of second heat transfer tubes 6 are connected between the outflow side of the turn-back flow passage 2c and the inflow side of the joining flow passage 2b.

<Flow of Refrigerant in Heat Exchanger>

Now, the flow of the refrigerant in the heat exchanger according to Embodiment 3 is described.

The refrigerant flowing through the refrigerant pipe flows into the laminated header 2 to be distributed at the distribution flow passage 2a, and then flows out toward the plurality of first heat transfer tubes 4. In the plurality of first heat transfer tubes 4, the refrigerant exchanges heat with air supplied by a fan, for example. The refrigerant flowing through the plurality of first heat transfer tubes 4 flows into the turn-back flow passage 2c to be turned back, and flows out therefrom toward the plurality of second heat transfer tubes 6. In the plurality of second heat transfer tubes 6, the refrigerant exchanges heat with air supplied by a fan, for example. The refrigerant flowing through the plurality of second heat transfer tubes 6 flows into the joining flow passage 2b of the laminated header 2 to be joined, and then flows out therefrom toward the refrigerant pipe. The refrigerant can reversely flow.

<Configuration of Laminated Header>

Now, the configuration of the laminated header of the heat exchanger according to Embodiment 3 is described.

Figure 13:
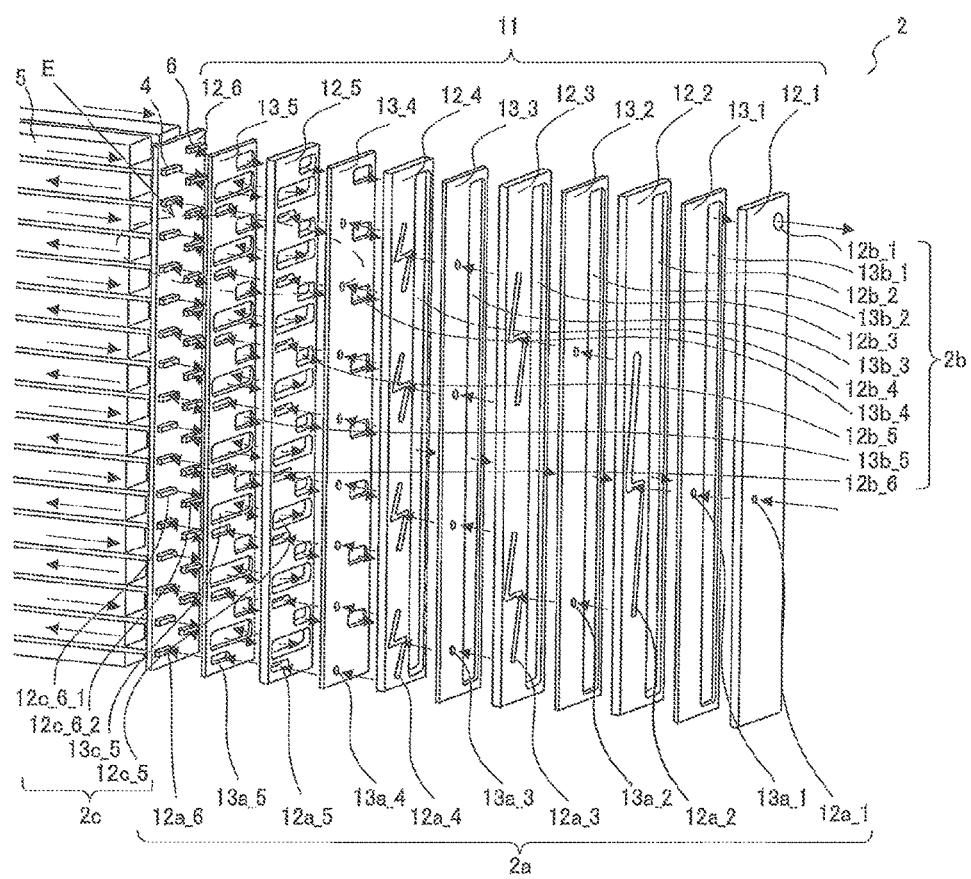
FIG. 13 is a perspective view for illustrating the heat exchanger according to Embodiment 3 under a state in which the laminated header is disassembled.
Figure 14:
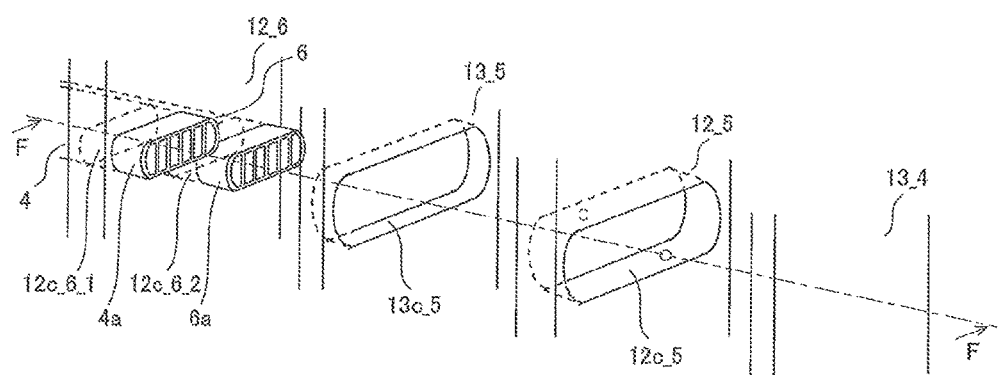
FIG. 14 is a perspective view for illustrating the heat exchanger according to Embodiment 3 under a state in which the laminated header is disassembled.

FIG. 13 and FIG. 14 are perspective views of the heat exchanger according to Embodiment 3 under a state in which the laminated header is disassembled. FIG. 14 is an enlarged perspective view of the portion E of FIG. 13.

As illustrated in FIG. 13 and FIG. 14, the bare member 12_5 has a first turn-back flow passage 12c_5 formed therein, and the bare member 12_6 has first turn-back flow passages 12c_6_1 and 12c_6_2 formed therein. The first turn-back flow passage 12c_5 is a through hole having a shape surrounding the outer peripheral surface of the first heat transfer tube 4 and the outer peripheral surface of the second heat transfer tube 6. The first turn-back flow passage 12c_6_1 is a through hole having a shape conforming to the outer peripheral surface of the first heat transfer tube 4. The first turn-back flow passage 12c_6_2 is a through hole having a shape conforming to the outer peripheral surface of the second heat transfer tube 6. When the bare members 12 and the cladding members 13 are laminated, the first turn-back flow passages 12c_5, 12c_6_1, and 12c_6_2 function as parts of the turn-back flow passage 2c. In the following, in some cases, the first turn-back flow passages 12c_5, 12c_6_1, and 12c_6_2 are collectively referred to as the first turn-back flow passage 12c.

Further, the cladding member 13_5 has a second turn-back flow passage 13c_5 formed therein. The second turn-back flow passage 13c_5 is a through hole having a shape surrounding the outer peripheral surface of the first heat transfer tube 4 and the outer peripheral surface of the second heat transfer tube 6. When the bare members 12 and the cladding members 13 are laminated, the second turn-back flow passage 13c_5 functions as a part of the turn-back flow passage 2c. In the following, in some cases, the second turn-back flow passage 13c_5 is referred to as the second turn-back flow passage 13c.

Gaps that allow entry of the heated brazing material due to the capillary phenomenon are formed between the inner peripheral surface of the first turn-back flow passage 12c_5 and a part of the outer peripheral surface of the first heat transfer tube 4, and between the inner peripheral surface of the first turn-back flow passage 12c_5 and a part of the outer peripheral surface of the second heat transfer tube 6. Gaps that allow entry of the heated brazing material due to the capillary phenomenon are formed between the inner peripheral surface of the second turn-back flow passage 13c_5 and a part of the outer peripheral surface of the first heat transfer tube 4, and between the inner peripheral surface of the second turn-back flow passage 13c_5 and a part of the outer peripheral surface of the second heat transfer tube 6. The inner peripheral surface of the first turn-back flow passage 12c_6_1 is fitted to the outer peripheral surface of the first heat transfer tube 4. The inner peripheral surface of the first turn-back flow passage 12c_6_2 is fitted to the outer peripheral surface of the second heat transfer tube 6. It is preferred that the surfaces be fitted to each other with a gap that allows entry of the heated brazing material due to the capillary phenomenon. Under a state in which the bare members 12 and the cladding members 13 are laminated and the first heat transfer tubes 4 and the second heat transfer tubes 6 are joined to the plate-like unit 11, the end portion 4a of each of the first heat transfer tubes 4 and an end portion 6a of each of the second heat transfer tubes 6 are positioned on the inner side of the first turn-back flow passage 12c_5 of the bare member 12_5. A configuration of the joining portion between the plate-like unit 11 and each of the first heat transfer tube 4 and the second heat transfer tube 6 and a method of joining the plate-like unit 11 and each of the first heat transfer tube 4 and the second heat transfer tube 6 to each other are described later.

<Flow of Refrigerant in Laminated Header>

Now, the flow of the refrigerant in the laminated header of the heat exchanger according to Embodiment 3 is described.

Figure 15:
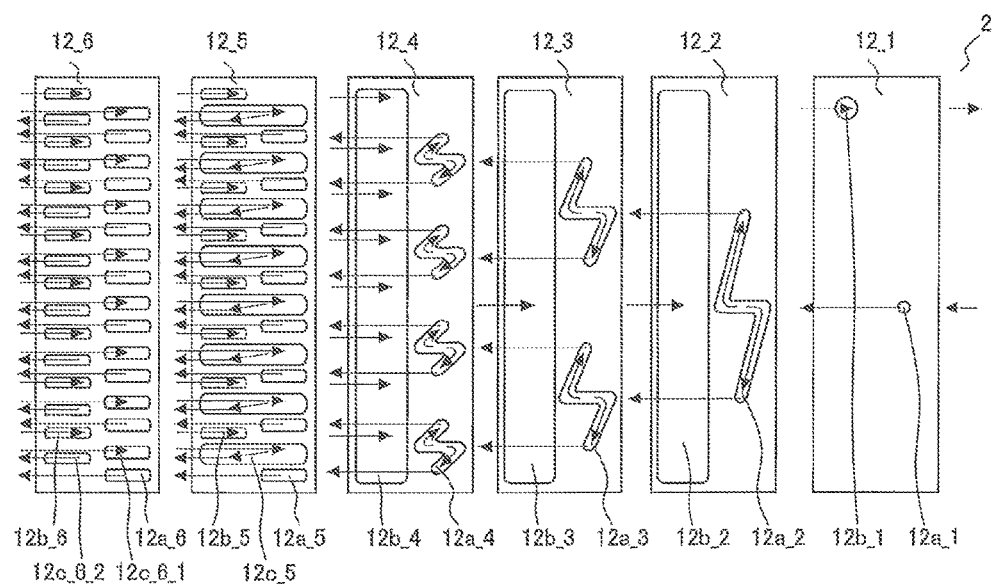
FIG. 15 is a developed view of the laminated header of the heat exchanger according to Embodiment 3.

FIG. 15 is a developed view of the laminated header of the heat exchanger according to Embodiment 3. Note that, in FIG. 15, the illustration of the cladding members 13 is omitted.

As illustrated in FIG. 13 and FIG. 15, the refrigerant flowing into the first heat transfer tube 4 passes through a region in the first heat transfer tube 4, which is positioned on the inner side of the first turn-back flow passage 12c_6_1 of the bare member 12_6, to thereby flow into the first turn-back flow passage 12c_5 of the bare member 12_5 and the second turn-back flow passage 13c_5 of the cladding member 13_5 to be turned back. Then, the refrigerant passes through a region in the second heat transfer tube 6, which is positioned on the inner side of the first turn-back flow passage 12c_6_2 of the bare member 12_6, to thereby flow into the second heat transfer tube 6.

<Configuration of Joining Portion Between Plate-Like Unit and Each of First Heat Transfer Tube and Second Heat Transfer Tube>

Now, the configuration of the joining portion between the plate-like unit and each of the first heat transfer tube and the second heat transfer tube of the heat exchanger according to Embodiment 3 is described.

Figure 16:
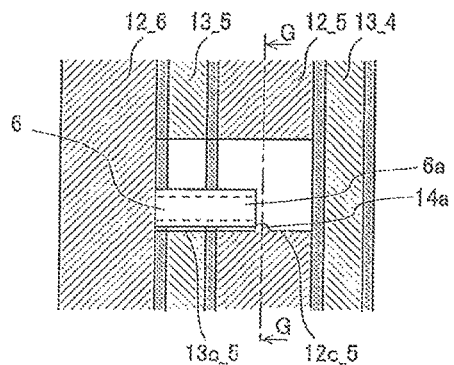
FIG. 16 are views for illustrating a configuration of the joining portion between the plate-like unit and each of the first heat transfer tube and a second heat transfer tube of the heat exchanger according to Embodiment 3.
Figure 16:
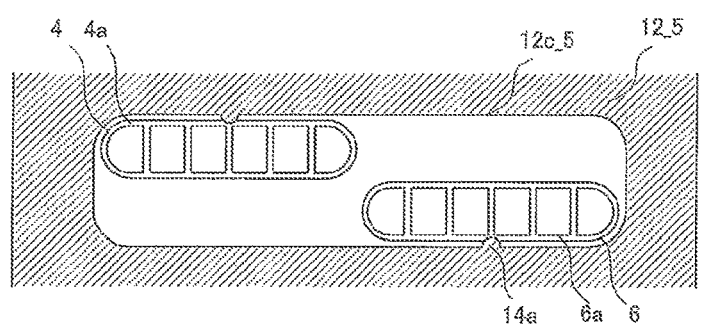

FIG. 16 are views for illustrating the configuration of the joining portion between the plate-like unit and each of the first heat transfer tube and the second heat transfer tube of the heat exchanger according to Embodiment 3. FIG. 16(a) is a sectional view taken along the line F-F of FIG. 14, for illustrating the state in which the bare members 12 and the cladding members 13 are laminated and each of the first heat transfer tube 4 and the second heat transfer tube 6 is joined to the plate-like unit 11. FIG. 16(b) is a sectional view taken along the line G-G of FIG. 16(a), for illustrating the state in which the bare members 12 and the cladding members 13 are laminated and each of the first heat transfer tube 4 and the second heat transfer tube 6 is joined to the plate-like unit 11. Note that, in FIG. 16(a), there is illustrated a state in which the brazing material is not applied to the inner peripheral surface of the second turn-back flow passage 13c, but the brazing material may be applied to the inner peripheral surface of the second turn-back flow passage 13c.

As illustrated in FIG. 16, the projections 14a are formed on the inner peripheral surface of the first turn-back flow passage 12c_5 of the bare member 12_5. The second heat transfer tube 6 is joined under a state in which the end portion 6a is brought into abutment against one of the projections 14a.

<Method of Joining Plate-Like Unit and Each of First Heat Transfer Tube and Second Heat Transfer Tube to Each Other>

Now, the method of joining the plate-like unit and each of the first heat transfer tube and the second heat transfer tube of the heat exchanger according to Embodiment 3 to each other is described.

The plate-like unit 11 and each of the first heat transfer tube 4 and the second heat transfer tube 6 are heated under a state in which the first heat transfer tube 4 is positioned so that the end portion 4a is brought into abutment against one of the projections 14a, and under a state in which the second heat transfer tube 6 is positioned so that the end portion 6a is brought into abutment against the other of the projections 14a.

<Usage Mode of Heat Exchanger>

Now, an example of a usage mode of the heat exchanger according to Embodiment 3 is described.

Figure 17:
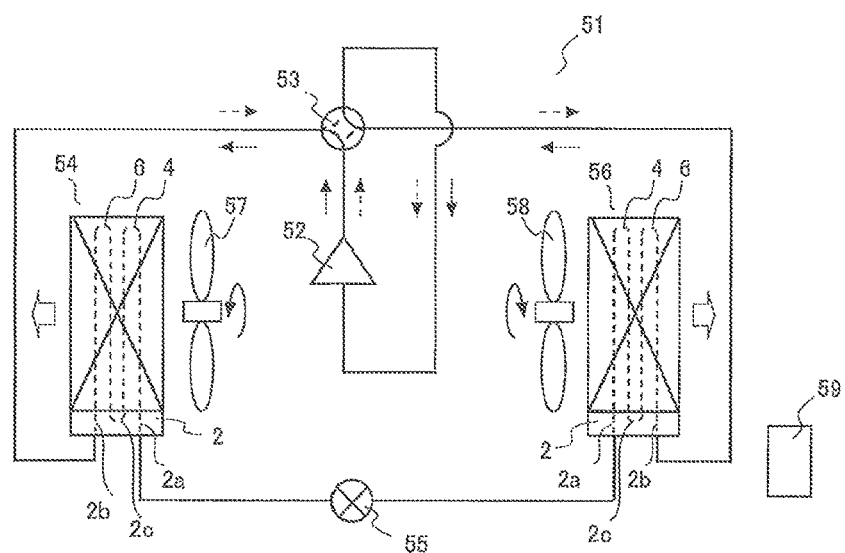
FIG. 17 is a diagram for illustrating a configuration of an air-conditioning apparatus to which the heat exchanger according to Embodiment 3 is applied.

FIG. 17 is a diagram for illustrating a configuration of an air-conditioning apparatus to which the heat exchanger according to Embodiment 3 is applied.

As illustrated in FIG. 17, the heat exchanger 1 is used for at least one of the heat source-side heat exchanger 54 or the load-side heat exchanger 56. When the heat exchanger 1 acts as the evaporator, the heat exchanger 1 is connected so that the refrigerant passes through the distribution flow passage 2a of the laminated header 2 to flow into the first heat transfer tube 4, and the refrigerant passes through the second heat transfer tube 6 to flow into the joining flow passage 2b of the laminated header 2. In other words, when the heat exchanger 1 acts as the evaporator, the refrigerant in a two-phase gas-liquid state passes through the refrigerant pipe to flow into the distribution flow passage 2a of the laminated header 2, and the refrigerant in a gas state passes through the second heat transfer tube 6 to flow into the joining flow passage 2b of the laminated header 2. Further, when the heat exchanger 1 acts as the condenser, the refrigerant in a gas state passes through the refrigerant pipe 5 to flow into the joining flow passage 2b of the laminated header 2, and the refrigerant in a liquid state passes through the first heat transfer tube 4 to flow into the distribution flow passage 2a of the laminated header 2.

<Actions of Heat Exchanger>

Now, actions of the heat exchanger according to Embodiment 3 are described.

In the heat exchanger 1, the plate-like unit 11 has the turn-back flow passage 2c formed therein, and in addition to the plurality of first heat transfer tubes 4, the plurality of second heat transfer tubes 6 are connected. That is, two rows of heat exchanging units of the heat exchanger 1 are formed in a direction in which the air or the like supplied by the fan is caused to pass. Therefore, the heat exchange amount can be increased without changing, for example, the area in a state of the front view of the heat exchanger 1.

Further, in the laminated header 2, the plate-like unit 11 and each of the first heat transfer tube 4 and the second heat transfer tube 6 are joined under a state in which the end portions of the two tubes, that is, the end portion 4a of the first heat transfer tube 4 and the end portion 6a of the second heat transfer tube 6 are inserted into the single turn-back flow passage 2c. Therefore, the formation of two rows of heat exchanging units of the heat exchanger 1 in the direction in which the air or the like supplied by the fan is caused to pass can be realized without complicating the structure of the plate-like unit 11. Besides, the first heat transfer tube 4 and the second heat transfer tube 6 can be collectively joined to the plate-like unit 11, thereby enhancing the production efficiency of the laminated header 2. Note that, similar actions are attained even when the laminated header 2 is constructed such that the cladding member 13 with the brazing material being applied thereto is laminated on the outermost side of the plate-like unit 11 in the laminating direction, that is, the brazing material is applied to the outermost surface of the plate-like unit 11 in the laminating direction.

Modified Example

Figure 18:
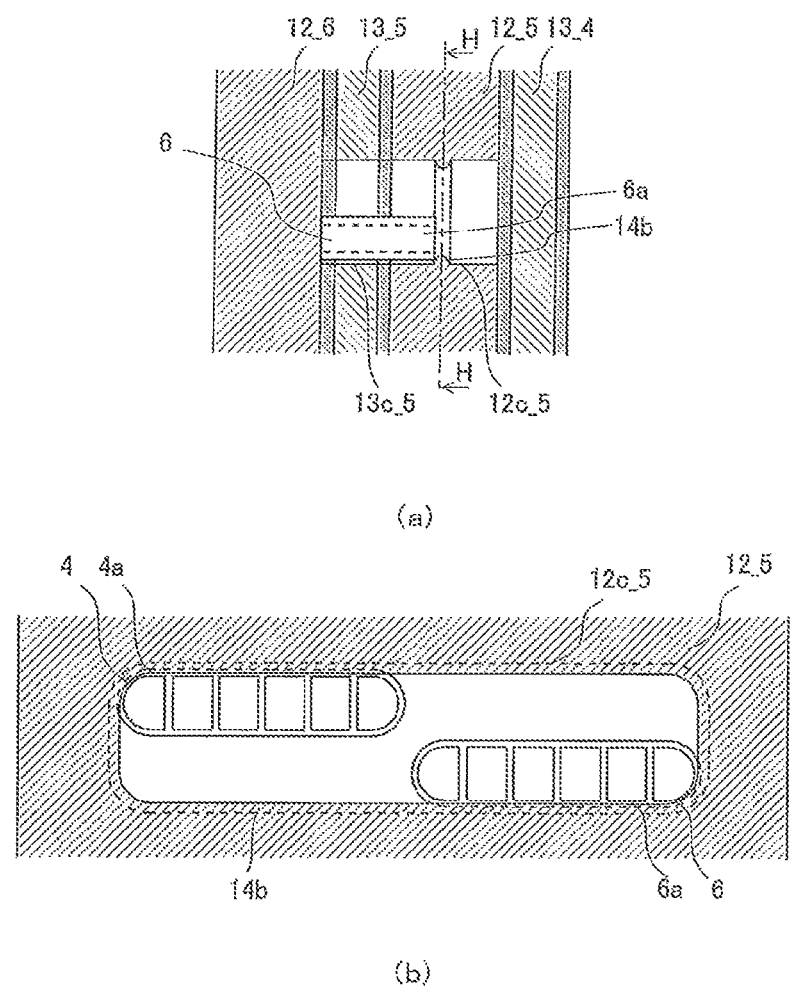
FIG. 18 are views for illustrating a configuration of the joining portion between the plate-like unit and each of the first heat transfer tube and the second heat transfer tube in a modified example of the heat exchanger according to Embodiment 3.

FIG. 18 are views for illustrating a configuration of the joining portion between the plate-like unit and each of the first heat transfer tube and the second heat transfer tube in a modified example of the heat exchanger according to Embodiment 3. Note that, FIG. 18(a) is a sectional view taken along the line F-F of FIG. 14, for illustrating the state in which the bare members 12 and the cladding members 13 are laminated and each of the first heat transfer tube 4 and the second heat transfer tube 6 is joined to the plate-like unit 11. FIG. 18(b) is a sectional view taken along the line H-H of FIG. 18(a), for illustrating the state in which the bare members 12 and the cladding members 13 are laminated and each of the first heat transfer tube 4 and the second heat transfer tube 6 is joined to the plate-like unit 11.

As illustrated in FIG. 18, the projection 14b is formed on the inner peripheral surface of the first turn-back flow passage 12c_5 of the bare member 12_5 so as to extend over the entire region of the inner peripheral surface in a circumferential direction thereof.

The present invention has been described above with reference to Embodiment 1 to Embodiment 3, but the present invention is not limited to those embodiments. For example, a part or all of the respective embodiments, the respective modified examples, and the like may be combined.

REFERENCE SIGNS LIST 1 heat exchanger 2 laminated header 2a distribution flow passage 2b joining flow passage 2c turn-back flow passage 3 header 3a joining flow passage 4 first heat transfer tube 4a end portion 5 fin 6 second heat transfer tube 6a end portion 11 plate-like unit 12, 12_1-12_6 bare member 12a, 12a_1-12a_6 first distribution flow passage 12b, 12b_1-12b_6 first joining flow passage 12c, 12c_5, 12c_6_1, 12c_6_2 first turn-back flow passage 13, 13_1-13_5 cladding member 13a, 13a_1-13a_5 second distribution flow passage 13b, 13b_1-13b_5 second joining flow passage 13c, 13c_5 second turn-back flow passage 14a, 14b projection 51 air-conditioning apparatus 52 compressor 53 four-way valve 54 heat source-side heat exchanger 55 expansion device 56 load-side heat exchanger 57 heat source-side fan 58 load-side fan 59 controller.

The invention claimed is:

1. A laminated header, comprising a plate-shaped unit comprising:
   first members having first flow passages formed therein; and
   second members having second flow passages formed therein,
   the first members and the second members being alternately laminated so that the first flow passages and the second flow passages are communicated with each other, and being brazed with each other, wherein
   each of the first members is thicker than each of the second members,
   the plate-shaped unit is configured such that a pipe extends into the plate-shaped unit beyond at least one of the first members and is joined to the plate-shaped unit under a state in which an end portion of the pipe is positioned between both ends of one of the first flow passages of one of the first members, and
   an outermost side surface of the plate-shaped unit in a laminating direction of the first-members and the second members has no brazing material.

2. The laminated header of claim 1, further comprising a projection formed on an inner peripheral surface of the at least one of the first flow passages or the second flow passages,
   wherein the pipe is joined under a state in which the end portion is brought into abutment against the projection and an outer peripheral surface of the end portion is free fitted to the inner peripheral surface of the at least one of the first flow passages or the second flow passages.

3. The laminated header of claim 2, wherein a distal end of the projection is prevented from being projected to an inner side of an inner peripheral surface of the pipe under a state in which the end portion of the pipe is viewed from an inner side of the pipe.

4. The laminated header of claim 2, wherein the projection is formed on a part of the inner peripheral surface of the at least one of the first flow passages or the second flow passages in a circumferential direction of the inner peripheral surface.

5. The laminated header of claim 2, wherein the projection is formed so as to extend over an entire region of the inner peripheral surface of the at least one of the first flow passages or the second flow passages in a circumferential direction of the inner peripheral surface.

6. The laminated header of claim 1,
wherein the pipe comprises a plurality of pipes, and
wherein the plate-shaped unit is configured such that the plurality of pipes are joined to the plate-shaped unit under a state in which the end portions of the plurality of pipes are inserted into a single flow passage of the at least one of the first flow passages or the second flow passages.

7. A method of joining a plate-shaped unit of a laminated header and a pipe to each other,
the plate-shaped unit comprising:
bare members having first flow passages formed therein with no brazing material being applied to each of the bare members; and
cladding members having second flow passages formed therein with a brazing material being applied to at least a front surface and a back surface of each of the cladding members,
the bare members and the cladding members being alternately laminated with the first flow passages and the second flow passages fluidly communicating with each other, one of the bare members being laminated on an outermost side of the plate-shaped unit in a laminating direction of the bare members and the cladding members, and each of the bare members being thicker than each of the cladding members,
the method comprising:
extending the pipe into the plate-shaped unit beyond at least one of the bare members and positioning an end portion of the pipe between both ends of one of the first flow passages of one of the bare members; and
heating the brazing material while supplying fluid from an inner side of the pipe toward the end portion of the pipe.

8. The method of claim 7, wherein the pipe is joined under a state in which fluid is supplied from the inner side of the pipe toward the end portion of the pipe.

9. The method of claim 8, wherein a temperature of the fluid is equal to or higher than a melting point of the brazing material.

10. The method of claim 8, wherein the fluid comprises air.

11. A heat exchanger, comprising:
the laminated header of claim 1; and
the pipe joined to the plate-shaped unit.

12. The heat exchanger of claim 11, wherein the pipe comprises a flat tube.

13. An air-conditioning apparatus, comprising the heat exchanger of claim 11.

* * * * *